(12) United States Patent
Rodríguez Bayo et al.

(10) Patent No.: US 11,796,217 B2
(45) Date of Patent: Oct. 24, 2023

(54) LOUVERS, AND WIND TURBINES COMPRISING SUCH LOUVERS

(71) Applicant: General Electric Renovables Espana, S.L., Barcelona (ES)

(72) Inventors: Roberto Rodríguez Bayo, Barcelona (ES); Anthony W. Millhouse, Barcelona (ES); Shelon A. Marini, Barcelona (ES); Omer Safak, Barcelona (ES); Adrià Roca, Barcelona (ES); Samir A. Salamah, Schenectady, NY (US)

(73) Assignee: General Electric Renovables Espana, S.L., Barcelona (ES)

( * ) Notice: Subject to any disclaimer, the term of this patent is extended or adjusted under 35 U.S.C. 154(b) by 54 days.

(21) Appl. No.: 17/407,622

(22) Filed: Aug. 20, 2021

(65) Prior Publication Data
US 2022/0057102 A1    Feb. 24, 2022

(30) Foreign Application Priority Data
Aug. 21, 2020   (EP) ..................... 20382763

(51) Int. Cl.
*F24F 13/08*       (2006.01)
*F03D 80/00*       (2016.01)

(52) U.S. Cl.
CPC .............. *F24F 13/08* (2013.01); *F03D 80/00* (2016.05); *F05B 2260/96* (2013.01); *F24F 2221/52* (2013.01)

(58) Field of Classification Search
CPC ........ F24F 13/08; F24F 13/081; F24F 13/088; F24F 13/082; F24F 13/105; F24F 13/24; F24F 2013/242; F24F 2221/52; F03D 80/00; F03D 80/80
See application file for complete search history.

(56) References Cited

U.S. PATENT DOCUMENTS

| | | | | |
|---|---|---|---|---|
| 5,104,431 A | * | 4/1992 | Fewel, Jr. | B01D 45/08 55/440 |
| 8,444,732 B2 | * | 5/2013 | Bratton | B01D 45/08 55/443 |
| 9,393,510 B2 | * | 7/2016 | MacDonald | B01D 45/08 |
| 2011/0103950 A1 | * | 5/2011 | Pesetsky | F03D 15/05 416/31 |
| 2016/0215999 A1 | * | 7/2016 | Bard | H05K 7/20736 |

FOREIGN PATENT DOCUMENTS

| | | |
|---|---|---|
| CN | 207 316 366 U | 5/2018 |
| EP | 3 147 582 A1 | 3/2017 |
| WO | WO 2013/163379 A1 | 10/2013 |

OTHER PUBLICATIONS

European Search Report Corresponding to EP20382433 dated Feb. 11, 2021.

* cited by examiner

*Primary Examiner* — David E Sosnowski
*Assistant Examiner* — Maxime M Adjagbe
(74) *Attorney, Agent, or Firm* — Dority & Manning, P.A.

(57) ABSTRACT

The present disclosure relates to louvers for enabling an air passage between an outside and an inside. More particularly, the present disclosure relates to louvers enabling said air passage while minimizing rain ingress towards an interior and minimizing noise produced in the interior. The present disclosure further relates to wind turbines including said louvers.

19 Claims, 5 Drawing Sheets

LOUVERS, AND WIND TURBINES COMPRISING SUCH LOUVERS

The present disclosure relates to louvers for enabling an air passage between an outside and an inside, e.g. between a wind turbine nacelle and an environment surrounding the nacelle. More particularly, the present disclosure relates to louvers enabling said air passage while minimizing rain ingress towards an interior and minimizing noise.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

Regulating temperature in the nacelle or in a portion of the nacelle may be required for maintaining an adequate functioning of the components inside it. For example, at least some of the components included in the nacelle, e.g. the generator, or converter may heat up during operation and adjusting their temperature may be necessary. Thus, the nacelle may include an air inlet and an air outlet so that air can flow from the outside of the nacelle to the inside and vice versa. An air flow towards the nacelle may also be used for heating or cooling (or other conditioning) purposes for other parts of the wind turbine.

The design of appropriate air inlets and outlets may pose some challenges. For instance, air inlets and outlets may not provide a suitable pressure drop, and hence a suitable air flow speed through them. Also, external elements which may damage a nacelle interior or its components, e.g. rain, hail, or snow may enter the nacelle through the air inlets and outlets.

In addition, at least some of the components of the nacelle may be noisy during operation, and the noise level may be increased in an exterior of the nacelle or the wind turbine due to the existence of air inlets and outlets.

Throughout the present disclosure, a louver may be understood as a structure generally including a frame and substantially parallel horizontal or vertical blades which is used to cover openings such as air vents, allowing air to flow through the louver while protecting an inside from undesired weather conditions. The blades of a louver may be also known as slats. Other terminology used in the art for "louver" includes "shutter" and "blinds".

Depending on the intended use of the louver, a louver may be of different types.

A louver may be a wind driven rain (WDR) louver. WDR louvers are designed to minimize the entrance of rain (or other precipitation) that wind may drive to an inside. I.e., WDR louvers are specifically designed to deal with rain in dynamic conditions (vs. static conditions, e.g. rain merely falling down due to the action of gravity and in absence of any other forces having transversal components which may drive the rain to an inside).

A louver may be an acoustic louver. An acoustic louver may provide for sound attenuation. For instance, an acoustic louver may be used in a factory to reduce the noise perceived in an outside of the factory due to the operation of the factory equipment in an inside of the factory.

Examples of the present disclosure provide compact louvers for establishing an air passage between an outside and an inside, e.g. of a nacelle, that at least partially resolve the aforementioned problems. Even though examples are particularly shown for nacelles of wind turbines, the same louvers may be used in other applications as well, e.g. buildings or other structures requiring some form of ventilation.

SUMMARY

In a first aspect of the present disclosure, a louver defining an air passage between an outside and an inside is provided. The louver comprises a bottom plate and a top plate defining a height of the louver, and a first side plate and a second side plate defining a width of the louver. The louver further comprises a plurality of vertical blades extending between the bottom plate and the top plate that have a profile in cross section. The profile includes: at least a rain prevention feature, and an outer blade portion arranged closer to the outside and an inner blade portion arranged closer to the inside defining a concave blade side and a convex blade side. The outer blade portion comprises an outer wall at the convex blade side and an outer retention flange at least partially included in the concave blade side that delimit at least in part an outer receptacle configured to receive acoustic absorber material. The inner blade portion comprises an inner wall in the concave blade side and an inner retention flange at least partially included in the convex blade side that delimit at least in part an inner receptacle configured to receive acoustic absorber material. The louver further comprises acoustic absorber material in the inner and outer receptacles.

In accordance with this aspect, a compact louver which can minimize rain ingress towards an interior and noise produced in the interior while enabling air intake and air exhaustion is provided. As the blades are positioned vertically, the rain stopped by one or more rain prevention features may be drained down by gravity.

Also, the combination of one or more rain prevention features with acoustic mitigation features may enable the louver to have a relatively low pressure drop in comparison with having these features in separate louvers.

It may be understood that a convex blade side is the side of the blade that is convex, i.e. a line segment between any two points on the blade surface goes outside the surface. On the convex blade side, the inner and outer wall portions form an angle greater than 180° between them. Thus, it may be also understood that a concave blade side is the side of the blade that is concave, i.e. a line segment between any two points on the blade surface are outside the surface. On the concave blade side, the inner and outer wall portions from an angle of less than 180° between them.

Acoustic absorber material may throughout the present disclosure be regarded as material that takes in sound energy when sound waves are encountered, as opposed to reflecting the energy. Part of the absorbed energy is transformed into heat and part is transmitted through the absorbing body. The energy transformed into heat is said to have been 'lost'. In general, soft, pliable, or porous materials (like cloths) serve as good acoustic insulators—absorbing most sound, whereas dense, hard, impenetrable materials (such as metals) reflect most. Also, porous metals have been shown to be effective in noise attenuation or acoustic absorption. Noise attenuating material and acoustic absorber material are used interchangeably herein.

Rain prevention features or rain ingress prevention features as used throughout the present disclosure may be regarded as any feature (particularly geometric shape or form) that avoids rain, or other precipitation to pass from the outside to the inside. These features may in particular include hooks, receptacles, slots, recesses that can receive or capture drops or droplets and avoid them to pass towards the inside (of the nacelle or building or other structure).

In another aspect, another louver defining an air passage between an outside and an inside is provided. The louver comprises a bottom plate and a top plate defining a height of the louver, and a first side plate and a second side plate defining a width of the louver. The louver further comprises a plurality of vertical blades extending from the bottom plate to the top plate and having a profile in cross section. The profile includes at least a rain prevention feature; an outer blade portion arranged closer to the outside and an inner blade portion arranged closer to the inside defining an angle between them and defining a concave blade side and a convex blade side.

The inner wall and the outer wall of a first blade of the plurality of blades that is closest to the first side plate of the louver, and/or a second blade of the plurality of blades that is closest to the second side plate of the louver, comprises a plurality of holes. And the plurality of blades comprise acoustic absorber material.

In accordance with this aspect, a louver which can minimize rain ingress towards an interior and noise produced in the interior while enabling air intake and air exhaustion is provided. The inner and outer walls of the first and second blades including holes may increase noise attenuation. In particular, these walls may contribute to absorption of low wavelength (i.e. high frequency) noise.

Herein, "high frequency", and thus "low wavelength", may refer to frequencies greater than 700 Hz, e.g. frequencies between 1 and 6 kHz. Accordingly, "low frequency" may refer to frequencies below 700 Hz, e.g. frequencies between 125 and 500 Hz.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
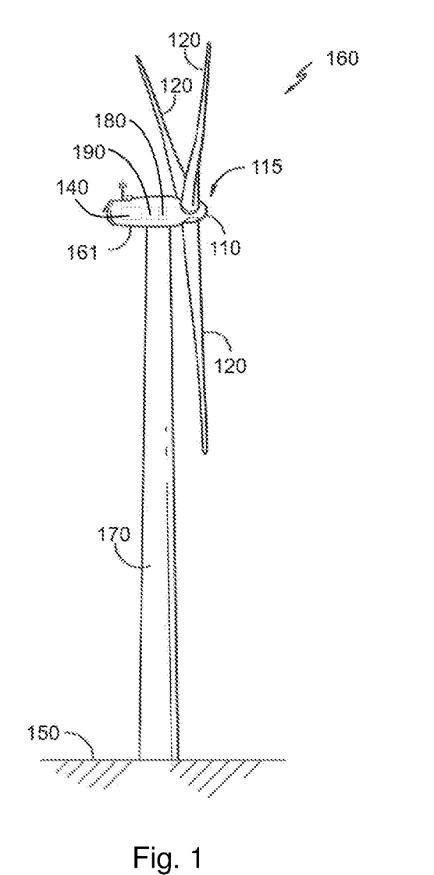
FIG. 1 illustrates a perspective view of one example of a wind turbine.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
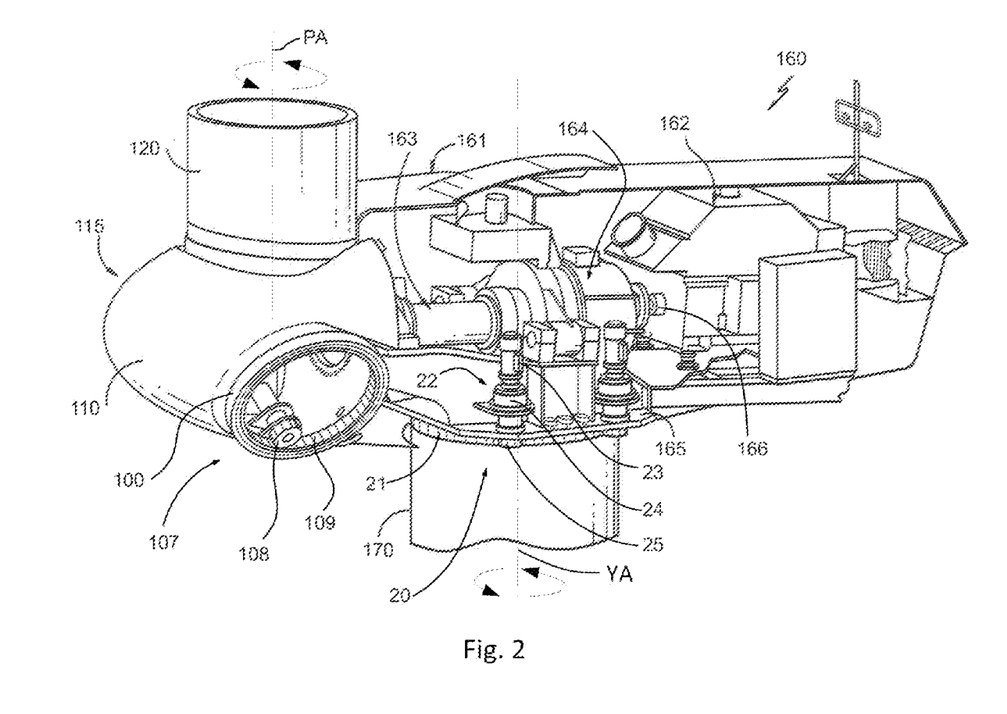
FIG. 2 illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

Figure 3:
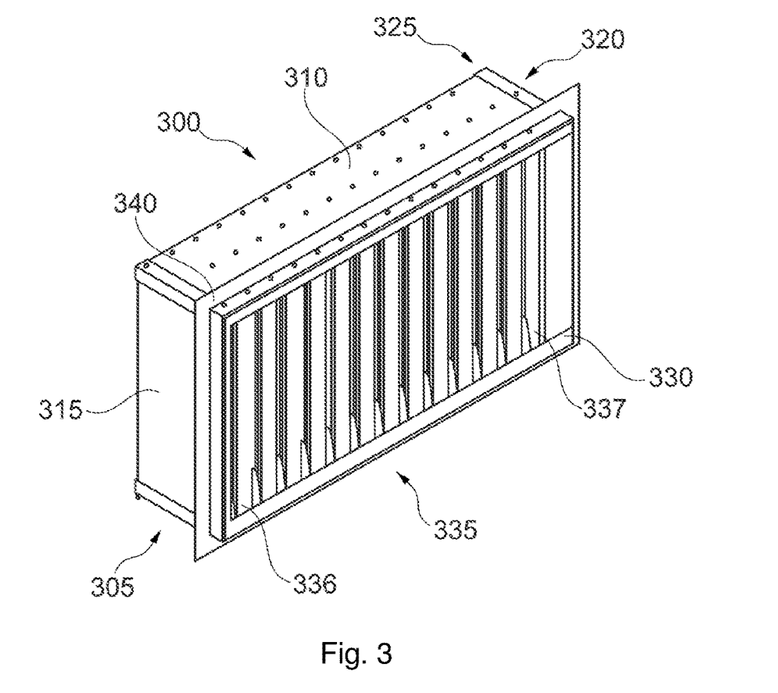
FIG. 3 schematically illustrates a perspective view of an example of a louver.

FIG. 3 schematically illustrates a perspective view of an example of a louver 300. In this example, the louver 300 defines an air passage between an outside (on the right hand side in FIG. 3) and an inside (on the left hand side in FIG. 3). The louver 300 has a bottom plate 305 and a top plate 310 that define a height of the louver 300, and also has a first side plate 315 and a second side plate 320 opposite the first side plate that define a width of the louver 300.

The louver may also have an inner plate 325 and an outer plate 330 that define a depth of the louver 300. These plates, and more in particular the top 310, bottom 305, first side 315 and second side 320 plates, may form a louver frame which may facilitate the fixation of the louver to a structure.

As a louver defines an air passage between an outside and an inside, it may be understood that an inner plate 325 is the plate of the louver configured to be oriented towards the inside and an outer plate 330 is the plate of the louver configured to be oriented towards the outside.

Figure 4:
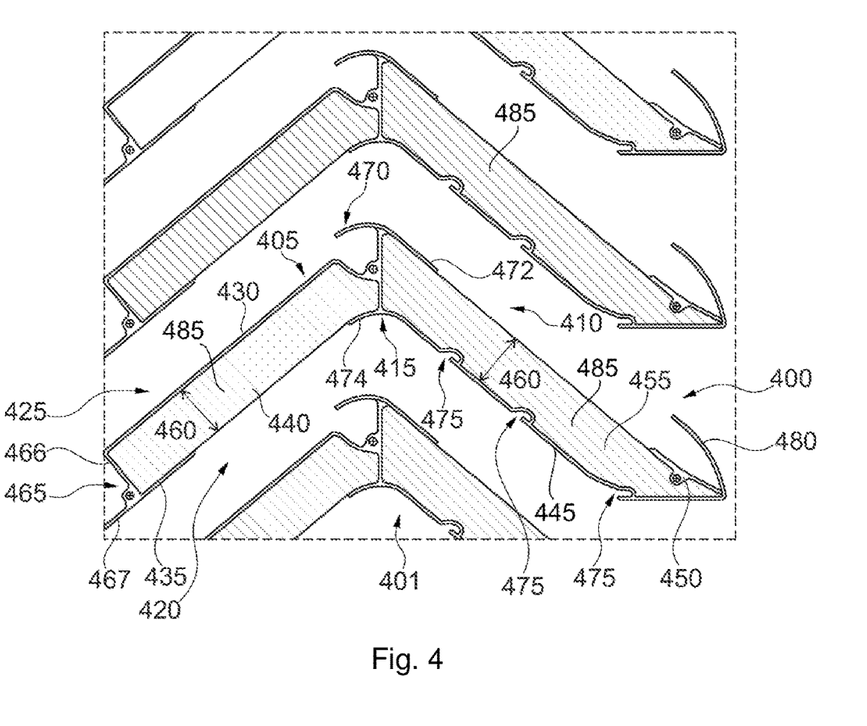
FIGS. 4 and 5 schematically illustrate an example of a cross section of a louver.

The louver 300 includes a plurality of vertical blades 335 extending from the bottom plate 305 to the top plate 310 and having a profile in cross section. An example of a cross section of a louver showing a profile of a blade 400 is shown in FIG. 4. The plurality of blades 335 may be fixed in place at least by a bottom 305 and a top 310 plate. Plates 315, 320, 325 and 330 may also help to keep the plurality of blades 335 in place and/or protect them.

The dimension of a blade lying between the top 310 and bottom 305 plates of the louver 300 may be considered the length or height of the blade. As the top 310 and bottom 305 plates may keep the plurality of blades 335 in place, i.e. the ends of the blades along a vertical direction may enter into contact with the top 310 and bottom 305 plates, the height of a blade may be substantially the same as, or slightly less than, the height of the louver 300.

The plurality of blades may comprise a first blade 336, which is the closest blade to the first side plate 315 of the louver 300, and a second blade 337, which is the closest blade to the second side plate 320 of the louver 300. In some examples, there may be a space between the first blade 336 and the first side plate 315 and/or between the second blade 337 and the second side plate 320. Such a space may be an empty space or may be filled, e.g. with filling material. In some examples, the filling material may be acoustic absorber material.

In some examples, different acoustic absorber material or noise mitigating material may be used in different blades. The louvers according to the present disclosure may be tuned or adapted to different implementations by varying the acoustic absorber material to optimize noise mitigation, optimize for mitigation of noise of specific frequencies and cost of manufacture.

A portion of an outer plate 330, and in some examples also a portion of an inner plate 325, may cover the space between sides plates 315, 320 and first and second blades 336, 337 in order to avoid the entrance of rain or other undesired elements into this space. In this way, acoustic absorber material may be protected.

The louver 300 may include a flange 340, e.g. one or more metallic strips, around a perimeter of the louver 300 to help to place it and fix it to its desired location.

The louver 300 shown in FIG. 3 may have a height between 0.5 and 2 meters (m), a width between 1 and 3 m and a depth between 0.2 and 0.5 m. In other examples, these or other dimensions of the louver are possible. Likewise, in the example of FIG. 3, louver 300 has 13 blades. But in general, a louver as described herein may have more or less blades.

The plates 305, 310, 315, 320, 325 and 330 and the plurality of blades 335 may be made of same or different materials. In an example, any of the plates and the blades of the louver 300 may be made of aluminum, steel or any of their alloys. Depending on the size, location and requirements of the louver 300, in some other examples the louver 300 or any of its components may be made of plastic, glass, wood or other materials.

A louver 300 may be assembled by obtaining the plurality of blades 335, e.g. by extrusion. Then, the plurality of blades 335 may be vertically attached between a bottom plate 305 and top plate 310. Acoustic absorber material may fill specific spaces of the blades as will be illustrated hereinafter. The acoustic absorber material may e.g. be high-density fiberglass, or foam or stone wool as commercially offered from Rockwool® or other. Afterwards, the remaining plates may be attached to form a louver. Fasteners such as one or more of bolts, screws, rivets and glue may be used to attach the blades to the plates and the plates with one another.

Figure 5:
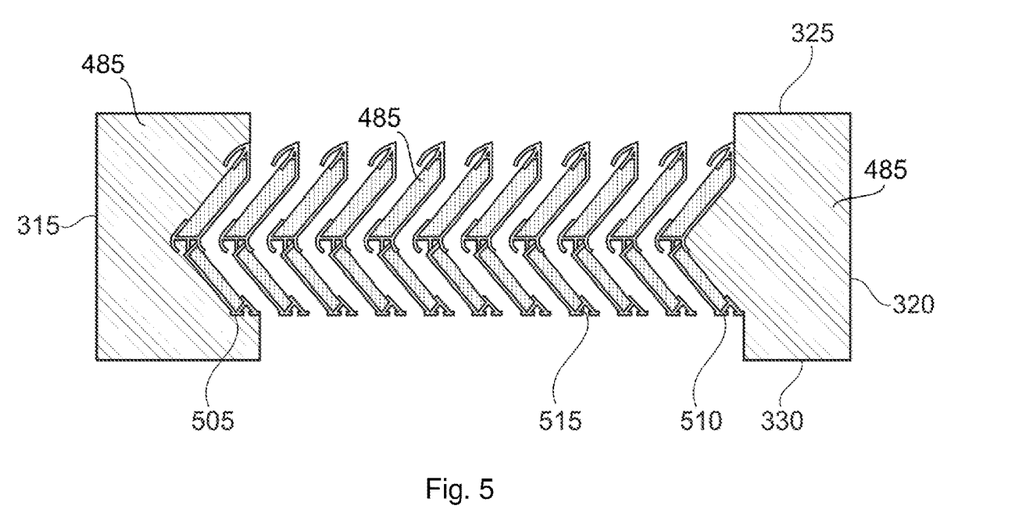

FIGS. 4 and 5 schematically show examples of a cross section of a louver, e.g. the louver 300 of FIG. 3. In these figures the cross section represents a plane being substantially perpendicular to the vertical direction, i.e. a plane substantially parallel to the top 310 and bottom 305 plates. Whereas FIG. 4 only illustrates a portion of a cross section of a louver delimited by the dashed lines in FIG. 4, FIG. 5 illustrates a cross section of an entire louver.

In FIG. 4, an outside (e.g. of a nacelle) lies on the left of the figure and an inside (e.g. of the nacelle) lies on the right of the figure. Therefore, air intake would take place from left to right and air exhaustion would take place from right to left. In FIG. 5, an outside lies at the bottom of the figure and an inside lies at the top of the figure. Thus, air intake would take place from bottom to top and air exhaustion would take place from top to bottom.

FIG. 4 illustrates an example of blades of a louver according to the present disclosure. As shown in this figure, a blade 400 of a plurality of blades has a profile in cross section which includes an outer blade portion 405 and an inner blade portion 410. In some examples, a blade 400 may include a middle blade portion 415. The outer blade portion 405 is a portion of the blade 400 which is closest to the outside and the inner blade portion 410 is a portion of the blade 400 which is closest to the inside. The middle portion 415 may be a portion of a blade 400 which lies in between the outer 405 and inner 410 blade portions. I.e., an inner blade portion 410 and an outer blade portion 405 may be joined at a middle blade portion 415.

The inner 410 and outer 405 blade portions define a concave blade side 420 and a convex blade side 425.

The outer blade portion 405 in this example comprises a substantially straight outer wall 430 in the convex blade side 425 and an outer retention flange 435 which is at least partially included in the concave blade side 420. The outer wall 430 and the outer retention flange 435 delimit, at least in part, an outer receptacle 440 which is configured to receive acoustic absorber material 485.

The inner blade portion 410 in this example comprises a substantially straight inner wall 445 in the concave blade side 420 and an inner retention flange 450 which is at least partially included in the convex blade side 425. The inner wall 445 and the inner retention flange 450 delimit, at least in part, an inner receptacle 455 which is configured to receive acoustic absorber material 485. The blade 400 comprises acoustic absorber material 485 in the inner 455 and outer 440 receptacles.

A wall of a blade profile may have a thickness, in cross section, between 1 and 10 millimeters (mm), and in particular between 2 and 5 mm. For example, the thickness of any of the outer 430 and inner 445 walls may be 3 mm. A width of a blade profile, i.e. a distance 460 between a convex 425 and a concave 420 side of a blade 400 may be between 10 and 70 mm, and more in particular between 30 and 40 mm.

A blade 400 includes at least a rain prevention feature (RPF) or "rain ingress prevention feature". For instance, a blade 400 may comprise one or more of the RPFs mentioned below.

An outer end of the outer blade portion 405 closest to the outside, in cross section, may comprise an outer rain prevention feature 465 which is partially included in the concave blade side 420. In some examples, the outer RPF 465 may include, in cross section, two substantially straight segments 466, 467 which are joined and define a vertical rain channel or gutter that is opened towards the outside. The straight segments 466, 467 together form a receptacle or opening to capture droplets.

The outer RPF 465 may be considered a first defensive feature against rain intake. Such a RPF may provide increased resistance to rain ingress to an inside while not increasing significantly the pressure drop in exhaustion operation. As the pressure drop is not significantly increased, air may easily flow from an inside towards an outside.

In some examples, in cross section and at the convex blade side 425, and end of the inner blade portion 410 closest to the inside may comprise an inner rain prevention feature 480. RPF 480 may capture the rain that has not yet been stopped by other portions of the blade 400. RPF 480 may include a curved segment with an end joined to the inner retention flange 450 and the other end being substantially parallel to the inner wall 460. This aspect helps to avoid a high pressure drop during air exhaustion. RPF 480 forms a catch stopping droplets that have not been stopped or diverted by other RPF's. In this example, the inner RPF 480 may be shaped like a hook.

In these or other examples, the inner wall 445 may further comprise one or more local recesses 475 on the concave side 420. RPFs 475, or local recesses 475, may collect rain that travels near the concave side 420 of the blade 400, e.g. rain that RPFs 465 and 470 of blade 401 may not be able to stop. Local recesses 475 may cause only a low pressure drop in exhaust operation.

In some examples, the inner 410 and outer 405 blade portions may be joined at a middle blade portion 415. The middle blade portion 415 may include, in the convex blade side 425, at least one of: a middle rain prevention feature 470 oriented towards the outside and a convex middle retention flange 472 oriented towards the inside.

Middle RPF 470 may capture the rain that has escaped RPF 465 and which is sliding or traveling near the outer wall 430. Accordingly, RPF 470 may include a curved segment, e.g. a hook which forms an opening towards the convex side 425. Drops may be caught in the hook and channeled vertically downwards.

The convex middle retention flange 472 may contribute to hold acoustic absorber material 485 together with the inner wall 445 and the inner retention flange 450. The convex middle retention flange 472 may include a segment substantially parallel to the inner wall 445. This may produce a small pressure drop in exhaust operation, which may facilitate air exhaustion.

An air flow carrying rain drops may pass over the convex side and a part of the drops will not be able to follow the air flow along the top of the convex side without being caught by the hook like feature 470. The drops that pass by the hook will generally be close to the concave side of the neighboring blade. The recesses 475 in the neighboring blade may capture those drops and drain them vertically down. Finally, the outer RPF is configured to capture any remaining drops in the airflow.

The middle blade portion 415 may comprise, in the concave blade side 420, a concave middle retention flange 474. The concave middle retention flange 474 is oriented towards the outside, i.e. it may contribute to hold acoustic absorber material 485 together with the outer wall 430 and the outer retention flange 435.

It is noted that the terms "concave" and "convex" with regard to the middle retention flanges 472, 474 do not refer to their shapes but rather to the side of the blade 400 where these retention flanges may be located.

In some examples (see FIG. 5), a louver may further comprise acoustic absorber material 485 between a first blade 505, which is the closest blade to the first side plate 315 of the louver, and the first side plate 315; and between a second blade 510, which is the closest blade to the second side plate 520, and the second side plate 320 of the louver. In some of these examples, the inner wall 410 and the outer wall 405 of the first 505 and second 510 blades comprise holes 605 (see FIG. 6B). Any of these aspects, either alone or in combination, may increase noise attenuation.

Therefore, a blade profile and a louver as described above allow air to exhaust with low pressure drop while preventing the ingress of rain and attenuating outgoing noise. These aspects may be controlled by varying the number of blades, RPFs and their shapes.

The separation between blades and angle between the outer blade portion 405 and the inner blade portion 410 may also play a role. The blades may be separated between 20 and 100 mm along the width of the louver, and more in particular between 30 and 60 mm. The angle between the outer blade portion 405 and the inner blade portion 410, in the concave blade side 420, may be between 40 and 160°, and more in particular between 70 and 130°.

The abovementioned blade dimensions (in cross section), e.g. thickness of a blade wall, width of a blade profile, angle between outer 405 and inner 410 blade portions, and/or separation between blades, may lead to an optimized louver which may have a low pressure drop, high sound attenuation and minimum rain intake.

According to another aspect, another louver defining an air passage between an outside and an inside may be provided. The louver comprises a bottom plate 305 and a top plate 310 defining a height of the louver, and a first side plate 315 and a second side plate 320 opposite the first side plate 315 defining a width of the louver. The louver also comprises a plurality of vertical blades 335 extending from the bottom plate 305 to the top plate 310 and having a profile in cross section which includes: at least a rain prevention feature and an outer blade portion 405 arranged closest to the outside and an inner blade portion 410 arranged closest to the inside defining an angle between them and defining a concave blade side 420 and a convex blade side 425.

The outer blade portion 405 comprises a substantially straight outer wall 430 in the convex blade side 425 and an outer retention flange 435 at least partially included in the concave blade side 420 that delimit at least in part an outer receptacle 440 configured to receive acoustic absorber material 485.

The inner blade portion 410 comprises a substantially straight inner wall 445 in the concave blade side 420 and an inner retention flange 450 at least partially included in the convex blade side 425 that delimit at least in part an inner receptacle 455 configured to receive acoustic absorber material 485.

Figure 6A:
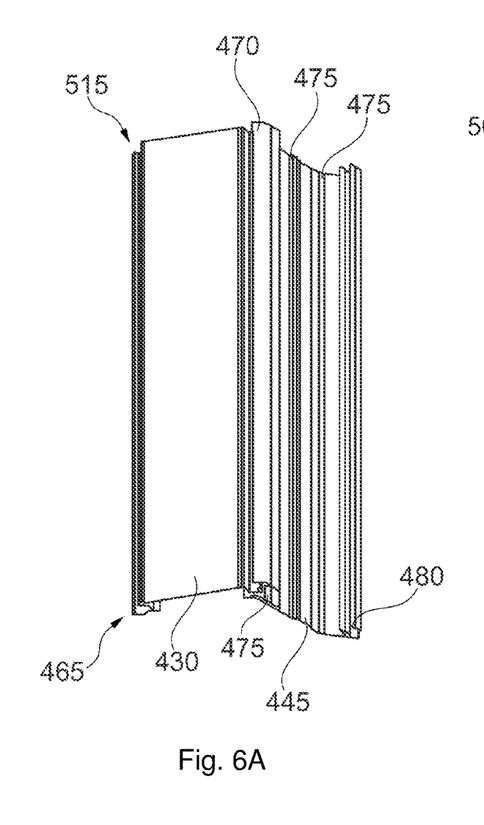
FIGS. 6A and 6B schematically illustrate an example of two blades of a louver.
Figure 6B:
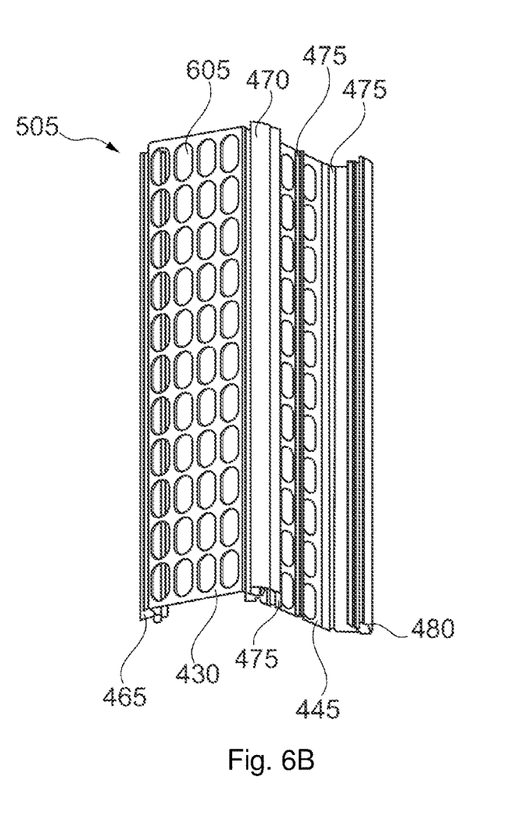

The inner wall 445 and the outer wall 430 of a first blade 336, 505 being the blade closest to the first side plate 315 of the louver, and a second blade 337, 510 being the blade closest to the second side plate 320 of the louver, comprise holes 605 (see FIG. 6B). In addition, the louver comprises acoustic absorber material 485 in the inner 440 and outer 455 receptacles.

The fact that the first 505 and second 510 blades include holes 605 may contribute to increase the absorption of low wavelength noise. Thus, sound attenuation may be improved. The inner wall 445 and the outer wall 430 of these blades 505, 510 may be perforated.

An example of a blade including holes 605, e.g. the first blade 505, is shown in FIG. 6B. In contrast, FIG. 6A shows an example of a blade 515, which be a blade different from the first 505 and second 510 blades in that it would not include holes.

In some examples, the louver may further comprise acoustic absorber material 485 between the first blade 505 and the first side plate 315, and between the second blade 510 and the second side plate 320.

Placing acoustic absorber material 485 between the first 505 and second 510 blades, and the first 315 and second 320 side plates, respectively, as indicated in FIG. 5, further contributes to outgoing noise mitigation. Specifically, the acoustic absorber material 485 placed in this way may increase the absorption of low wavelength noise.

In some examples, only the first 505 and second 510 blades may include holes 605. This may suffice for achieving a good attenuation of low wavelength noise. The holes 605 make it possible for the sound waves to reach the absorber material arranged between the side plates and the outer blades closest to them. Herein, "high frequency", and thus "low wavelength", may refer to frequencies greater than 700 Hz, e.g. frequencies between 1 and 6 kHz.

If specific frequencies are to be attenuated to a larger extent, the louver could be adapted, even in situ, by having more space between the outer blades and the side plates i.e. by reducing the total number of blades.

The holes 605 may be oblong holes, i.e. they may be longer along a length of the corresponding blade than along a width of the corresponding blade, as illustrated in FIG. 6B. The holes 605 of the inner 445 and outer 430 walls of the blades 505, 510 may be aligned along a length of the corresponding blade. The alignment and shape of the holes 605 may contribute to increment the absorption of the noise having low wavelength.

In some examples, at least one of the following applies concerning the at least one RPF that the louver includes: the outer wall 430 of the louver, at an end closest to the outside, includes an outer rain prevention feature 465 partially comprised in the concave blade side 420; the inner wall 445 of the louver, at an end closest to the inside, includes an inner rain prevention feature 480 partially comprised in the convex blade side 425; and a middle blade portion 415 at where the inner blade portion 410 and the outer blade portion 405 are joined, in the convex blade side 425, includes a middle rain prevention feature 470.

One or more of these RPFs may help to prevent the entrance of rain to an inside. In FIGS. 6A and 6B it can also be seen that any of the rain prevention features 465, 470, 475, 480 comprise a substantially vertical channel along the height of the louver. As commented above, this helps to drain down the collected rain in the different RPFs.

Figure 7:
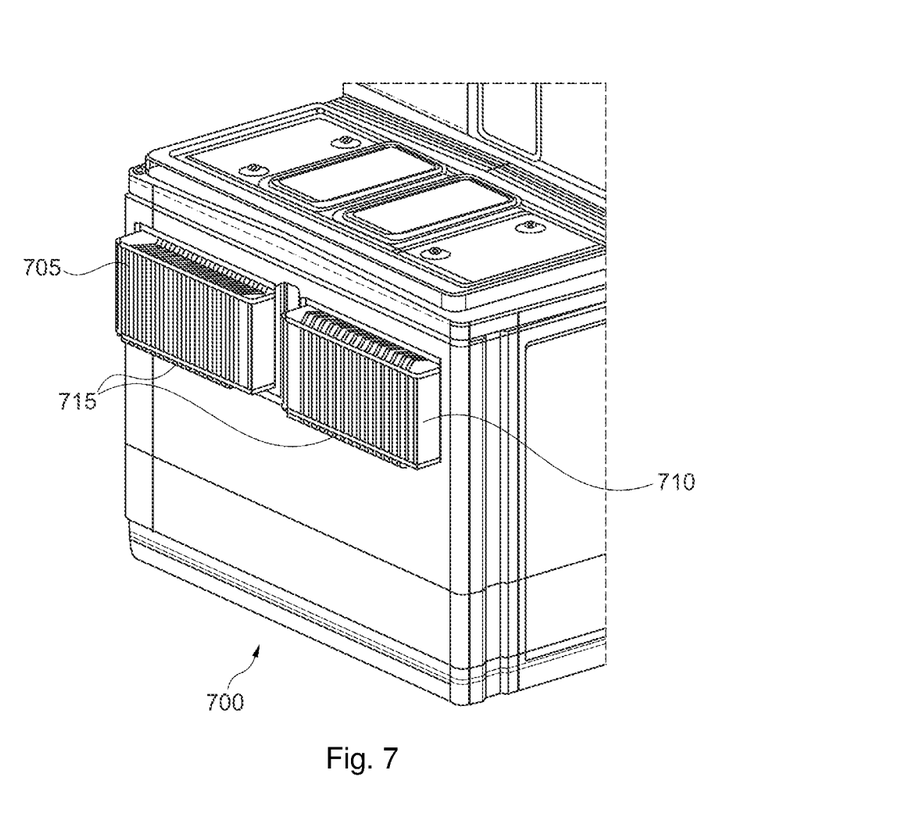
FIG. 7 schematically represents an example of two louvers mounted to a nacelle.

Sill in another aspect, a wind turbine 160 comprising a tower 170, a nacelle 161, 700 on top of the tower 170, a rotor 115 rotatably mounted to the nacelle 161 and a louver 705, 710 attached to the nacelle 161, 700 defining an air passage between an outside and an inside of the nacelle 161, 700 is provided. The louver 705, 710 comprises a bottom plate 305 and a top plate 310 defining a height of the louver, and a first side plate 315 and a second side plate 320 opposite the first side plate 315 defining a width of the louver. The louver also comprises a plurality of vertical blades 335 extending from the bottom plate 305 to the top plate 310 and having a profile in cross section which includes: an outer blade portion 405 arranged closest to the outside and an inner blade portion 410 arranged closest to the inside joined at a middle portion 415 along the width of the louver 705, 710 and defining a concave blade side 420 and a convex blade side 425.

The outer blade portion 405 comprises a substantially straight outer wall 430 in the convex blade side 425, and at an end of the outer wall 430 closest to the outside, an outer rain prevention feature 465 partially included in the concave blade side 420 and an outer retention flange 435 partially included in the concave blade side 420 and an outer retention flange 435 in the concave 420 blade side;

The inner blade portion 410 comprises a substantially straight inner wall 445 in the concave blade side 420, and at an end of the inner wall 445 closest to the inside, an inner retention flange 450 partially included in the convex blade side 425 and an inner rain prevention feature 480 in the concave blade side 425.

The middle blade portion 415 comprises, in the convex blade side 425, a middle rain prevention feature 470 and a convex middle retention flange 472 oriented towards the inside and, in the concave blade side 420, a concave middle retention flange 474 oriented towards the outside.

In addition, the inner wall 445 and the outer wall 430 of a first blade 336, 505 being the blade closest to the first side plate of the louver 315, and a second blade 337, 510 being the blade closest to the second side plate of the louver 320, comprise holes 605.

Furthermore, the louver 705, 710 comprises acoustic absorber material 485 at least partially enclosed by the outer wall 430 and the outer 435 and concave middle 474 retention flanges, and acoustic absorber material 485 at least partially enclosed by the inner wall 445 and the inner 450 and convex middle 472 retention flanges.

According to this aspect, rain ingestion by a nacelle 161, 700 of a wind turbine 160 may be reduced and noise attenuation may be increased by a compact AWDR louver.

A nacelle 700 with two louvers 705, 710 as described herein mounted to a lateral wall of the nacelle 700, e.g. the nacelle 161 of wind turbine 160 of FIG. 1, is illustrated in FIG. 7. One or more louvers may be mounted to a nacelle 700. Louvers 705, 710 do not show a top plate 310 so that the orientation of the vertical blades may be seen.

Each of the louvers 705, 710 may include a bird screen 715 that may prevent the entrance of birds to the nacelle 700. The bird screen 715 may be comprised in a front panel 330 of the louvers 705, 710.

Any of the louvers 705, 710 may include one or more of the RPFs mentioned throughout this disclosure as well as acoustic absorber material 485 in the corresponding receptacles 440, 455. Any of the louvers 705, 710 may comprise acoustic absorber material 485 in the ends of the louver, i.e. between the first blade 336, 505 and the first side wall 315 and/or between the second blade 337, 510 and the second side wall 320. The first 336, 505 and/or second 337, 510 blades may include holes 605, e.g. they may be perforated.

The orientation of the concave 420 and convex 425 sides of the blades is not limited. I.e., in FIGS. 4 and 5 RPF 470 is oriented to the top and the left, respectively. But RPF 470 may be also oriented to the bottom and the right in these figures, respectively, without altering the operation of the louver. This is further illustrated in FIG. 7, wherein the convex side of the blades in louver 705 faces the convex side of the blades in louver 710.

In any of the louvers 705, 710, a wall of a blade profile 430, 445, in cross section, may have a thickness that ranges between 1 and 10 mm, and specifically between 2 and 5 mm.

In any of the louvers 705, 710 a width of a blade profile 460, in cross section, may range between 10 and 70 mm, and specifically between 30 and 40 mm.

In any of the louvers 705, 710 an angle between the outer 405 and inner 410 blade portions in the concave blade side 420 is between 40 and 160°, and specifically between 70 and 130°.

The dimensions mentioned above may contribute to maximize noise attenuation, minimize rain intake and have a low pressure drop, in particular during exhaust operation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A louver defining an air passage between an outside and an inside comprising:
   a bottom plate and a top plate defining a height of the louver, and a first side plate and a second side plate defining a width of the louver;
   a plurality of vertical blades extending between the bottom plate and the top plate and having a profile in cross section, the profile comprising:
     one or more rain ingress prevention features;
     an outer blade portion arranged closer to the outside of the louver and an inner blade portion arranged closer to the inside of the louver, the outer blade portion and the inner blade portion defining a concave blade side and a convex blade side;
     the outer blade portion comprising a continuous outer wall at the convex blade side and an outer retention flange at least partially included in the concave blade side that delimit at least in part an outer receptacle;
     the inner blade portion comprising a continuous inner wall at the concave blade side and an inner retention flange at least partially included in the convex blade side that delimit at least in part an inner receptacle; and
   an acoustic absorber material in the inner and outer receptacles.

2. The louver according to claim 1, wherein the profile comprises one of the rain ingress prevention features formed as an outer rain ingress preventer at least partially included in the concave blade side proximate an end of the outer blade portion that is closest to the outside.

3. The louver according to claim 2, wherein the outer rain ingress preventer comprises, in cross section, two substantially straight joined segments that define a vertical rain channel opened towards the outside.

4. The louver according to claim 1, wherein the profile comprises one of the rain ingress prevention features formed as an inner rain preventer at the convex blade side proximate an end of the inner blade portion that is closest to the inside.

5. The louver according to claim 1, wherein the inner wall further comprises one or more local recesses at the concave side.

6. The louver according to claim 1, wherein the inner and outer blade portions are joined at a middle blade portion.

7. The louver according to claim 6, wherein the middle blade portion includes a middle rain ingress prevention feature oriented towards the outside at the convex blade side.

8. The louver according to claim 1, further comprising acoustic absorber material between one or both of the first side plate and a first blade of the plurality of vertical blades that is closest to the first side plate, or the second side plate and a second blade of the plurality of vertical blades that is closest to the second side plate.

9. The louver according to claim 8, wherein the inner wall and the outer wall of the first and the second blades comprise holes.

10. A louver defining an air passage between an outside and an inside comprising:
    a bottom plate and a top plate defining a height of the louver, and a first side plate and a second side plate defining a width of the louver;
    a plurality of vertical blades extending from the bottom plate to the top plate and having a profile in cross section, the profile comprising:
      at least one rain ingress prevention feature;
      an outer blade portion arranged closer to the outside and an inner blade portion arranged closer to the inside and defining an angle between the outer blade portion and the inner blade portion, the outer blade portion and the inner blade portion defining a concave blade side and a convex blade side;
    the outer blade portion comprising an outer wall at the convex blade side that prevents water droplets from the outside passing through the outer wall;
    the inner blade portion comprising an inner wall at the concave blade side that prevents water droplets from the outside passing through the inner wall;
    wherein one or both of the inner wall and the outer wall of a first blade of the plurality of blades that is closest to the first side plate or a second blade of the plurality of blades that is closest to the second side plate comprises a plurality of holes; and
    wherein the plurality of blades comprise acoustic absorber material in an outer receptacle in the outer blade portion delimited at least partially by the outer wall and in an inner receptacle in the inner blade portion delimited at least partially by the inner wall.

11. The louver according to claim 10, further comprising acoustic absorber material between the first blade and the first side plate, and between the second blade and the second side plate.

12. The louver according to claim 10, wherein the holes of the inner and outer walls of the first and second blades are aligned along a length of the corresponding first or second blade.

13. The louver according to claim 10, wherein the holes are oblong holes.

14. The louver according to claim 10, wherein:
the outer wall of the outer blade portion comprises a substantially straight outer wall at the convex blade side and an outer retention flange at least partially included in the concave blade side that delimit at least in part the outer receptacle configured to receive the acoustic absorber material; and
the inner wall of the inner blade portion comprises a substantially straight inner wall at the concave blade side and an inner retention flange at least partially included in the convex blade side that delimit at least in part the inner receptacle configured to receive the acoustic absorber material.

15. A wind turbine, comprising:
a tower;
a nacelle on top of the tower;
a rotor rotatably mounted to the nacelle;
a louver attached to the nacelle defining an air passage between an outside and an inside of the nacelle, the louver comprising:
a bottom plate and a top plate defining a height of the louver, and a first side plate and a second side plate defining a width of the louver;
a plurality of vertical blades extending from the bottom plate to the top plate and having a profile in cross section, the profile comprising:
an outer blade portion arranged closer to the outside joined with a middle blade portion to an inner blade portion arranged closer to the inside, the inner blade portion and the outer blade portion defining a concave blade side and a convex blade side;
the outer blade portion comprising an outer wall at the convex blade side configured to prevent water droplets from the outside passing through the outer wall;
an outer rain ingress prevention feature at an end of the outer wall closest to the outside at least partially included in the concave blade side and an outer retention flange at the concave blade side;
the inner blade portion comprising an inner wall at the concave blade side configured to prevent water droplets from the outside passing through the inner wall and an inner retention flange at least partially included in the convex blade;
an inner rain ingress prevention feature in the convex blade side proximate an end of the inner blade portion that is closest to the inside;
the middle blade portion comprising, at the convex blade side, a middle rain prevention feature and a convex middle retention flange and, in the concave blade side, a concave middle retention flange;
wherein the inner wall and the outer wall of a first blade of the plurality of blades closest to the first side plate, and a second blade of the plurality of blades closest to the second side plate comprise holes; and
an acoustic absorber material at least partially enclosed by the outer wall and the outer and concave middle retention flanges, and at least partially enclosed by the inner wall and the inner and convex middle retention flanges.

16. The wind turbine according to claim 15, wherein the louver further comprises acoustic absorber material between the first blade and the first side plate, and between the second blade and the second side plate.

17. The wind turbine according to claim 15, wherein a wall of the blade profile, in cross section, has a thickness of between 1 and 10 mm.

18. The wind turbine according to claim 15, wherein the blade profile, in cross section, has a width between 10 and 70 mm.

19. The wind turbine according to claim 15, wherein an angle between the outer and inner blade portions in the concave blade side is between 40 and 160 degrees.

\* \* \* \* \*